Figure 1:
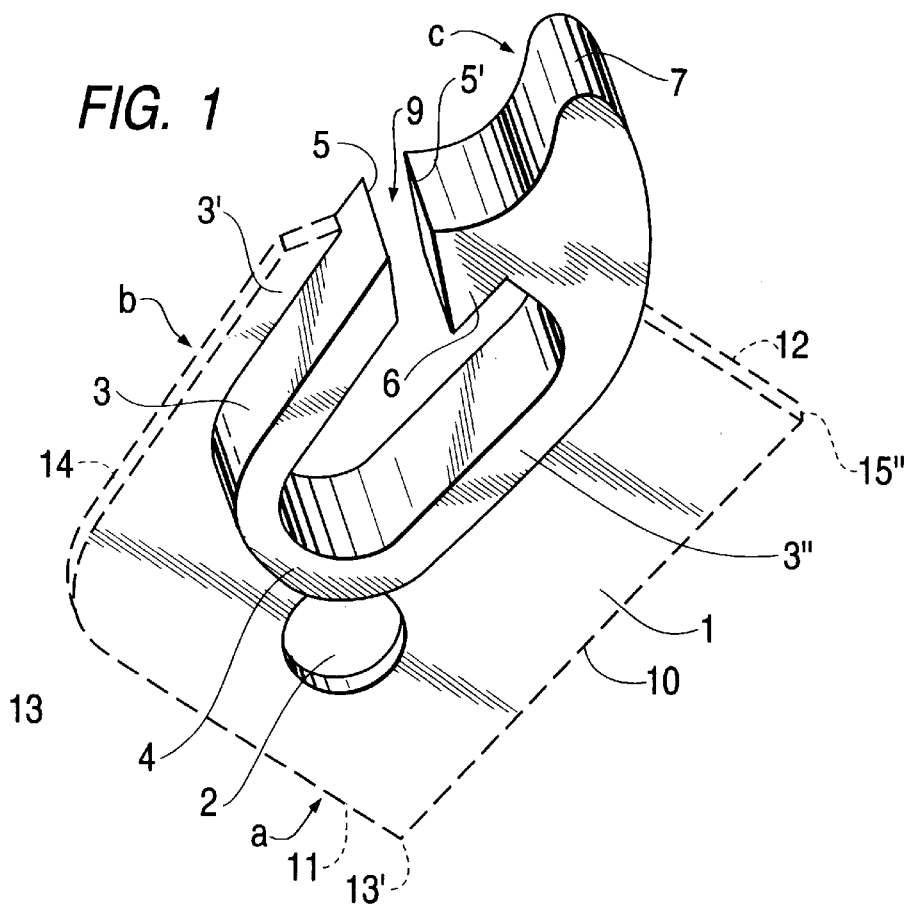

United States Patent
Fernández

[11] Patent Number: 6,112,379
[45] Date of Patent: Sep. 5, 2000

[54] FASTENER DEVICE FOR STRINGS

[76] Inventor: Eduardo Roberto Fernández, San Martin 686, 7°piso of. "72" - (1004), Buenos Aires, Argentina

[21] Appl. No.: 08/864,734

[22] Filed: May 28, 1997

[51] Int. Cl.[7] .................................................. A43C 3/00
[52] U.S. Cl. ........................ 24/712.1; 24/712.2; 24/714; 24/713.9; 24/712.9
[58] Field of Search ................. 24/712.1, 712.2, 24/713.6, 713.8, 714.6, 715.1, 715.3, 715.7, 714.5, 714, 713.9, 712.9

[56] References Cited

U.S. PATENT DOCUMENTS

| | | | |
|---|---|---|---|
| 284,730 | 9/1883 | Foster | 24/712.1 |
| 672,986 | 4/1901 | Northrop | 24/714.4 X |
| 730,031 | 6/1903 | Leopold | 24/712.1 |
| 743,106 | 11/1903 | Rotz | 24/712.2 |
| 791,482 | 6/1905 | Means | 24/712.2 X |
| 887,669 | 5/1908 | Loe | 24/712.2 X |
| 888,978 | 5/1908 | Elphinstone | 24/712.2 X |
| 1,185,483 | 5/1916 | Cole | 24/714.5 |
| 2,233,083 | 12/1941 | Rzepa | 24/712.1 X |
| 2,254,579 | 9/1941 | Okie | 24/712.1 |
| 4,970,763 | 11/1990 | Nwoko | 24/714.3 X |
| 5,467,511 | 11/1995 | Kubo | 24/712.1 X |

*Primary Examiner*—James R. Brittain
*Assistant Examiner*—Robert J. Sandy
*Attorney, Agent, or Firm*—Staas & Halsey

[57] ABSTRACT

A fastener for cords includes a support body, a first flexible lever arm and a second flexible lever arm. The support body has an insertion device to guide a cord onto a main surface thereof. The first flexible lever arm is provided on the main surface of the support body and has a free jaw end. The first flexible lever arm has a cord guide to guide the cord from the insertion device of the support body to the free jaw end of the first lever arm. The second flexible lever arm is also provided on the main surface of the support body. The second flexible lever arm has a free jaw end opposing the free jaw end of the first flexible lever arm with a cord path being defined between the free jaw ends of the first and second flexible lever arms, the cord path having a width that is variable with flexing of the first lever arm. The second flexible lever arm has a retentive hooking tooth provided at a tip of the free jaw end thereof. The free jaw end of the first flexible lever arm fits under the retentive hooking tooth such that the retentive hooking tooth retains the first flexible lever arm in a flexed position. The second flexible lever arm has loosening device thereon for releasing the first flexible lever arm from under the retentive hooking tooth.

10 Claims, 3 Drawing Sheets

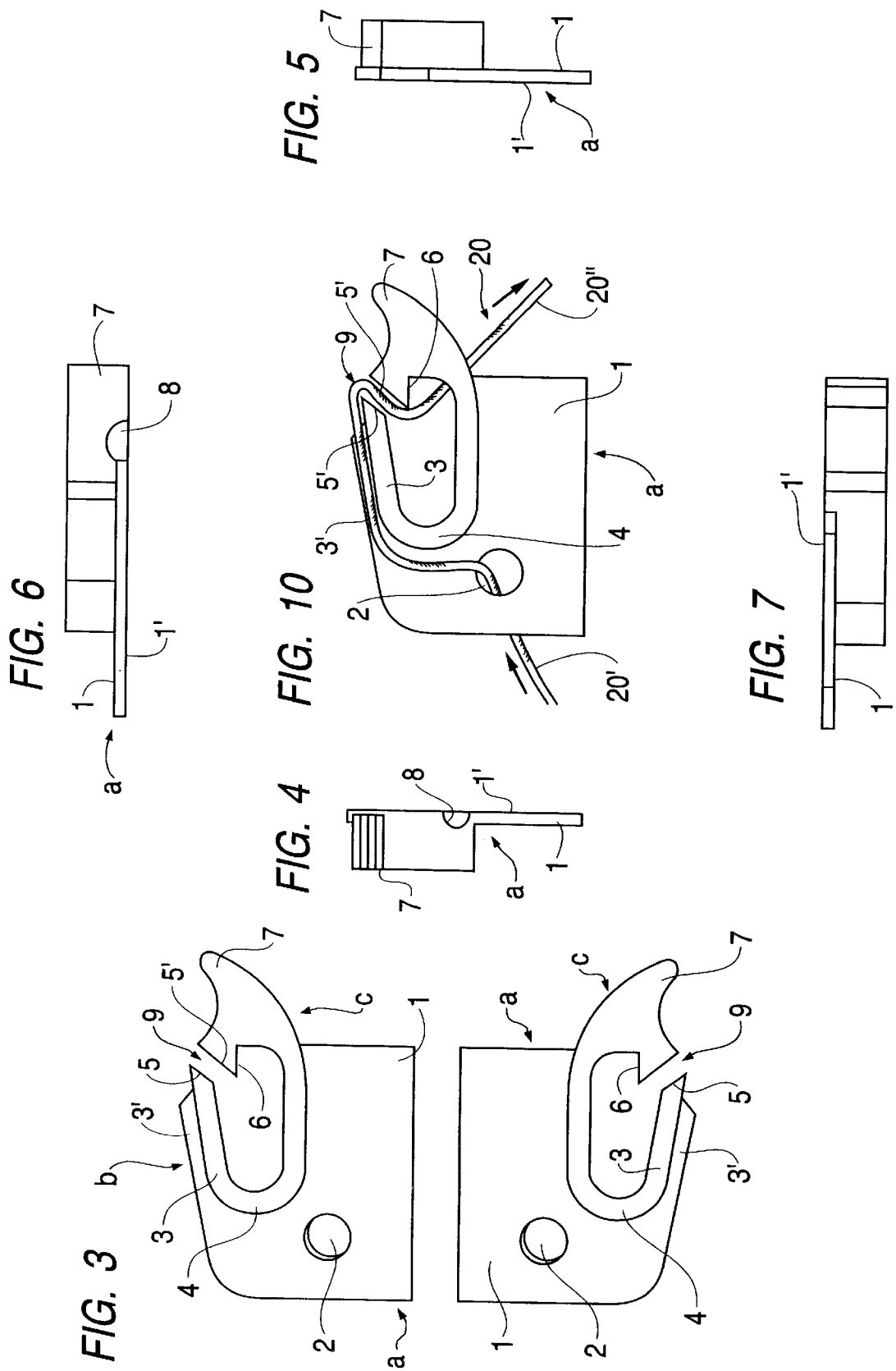

FASTENER DEVICE FOR STRINGS

II. BACKGROUND OF THE INVENTION

1. Field of the Invention

The present invention relates to a fastener device for strings and its object is to supply a simple fastening device easy to unfasten, any type of flexible filiform members, i.e. shoe laces, inserted through said device. Said device being also aimed for the most diverse applications.

Although the present invention was originally conceived particularly for laces for shoes, tennis shoes and other footwear, —being this the ambit of the preferred embodiment of said invention—it is actually apt to be employed on any structure or functional set requiring a positional securing fastener for cords, strands, bands and other through said device. Due to the abovementioned, all the foregoing in this specification related with the fastener applied for shoe laces shall be understood as extensive to any other compatible application with the constitutive and functional features of the new device.

2. Description of the Related Art

From very ancient corded footwear have constituted a practical and classic form of fastening of the user's foot. By means of these type of elements, the adaptation of footwear to the anatomy of the foot in the first place consists in the loosening of the tension of the cord in order to enlarge the opening of the footwear until it allows a comfortable introduction of the foot, then fastening the cordage with the desired tension of embrace by means of the traction of the corresponding ends of said cord.

It is clear that, after that embracing traction, the ends of each cord are relatively long, likely to be stepped on by the user with the consequent risk of falling. Due to this, in order to complete the adjustment the mentioned ends of the cords are usually made into a knot finishing off with a decorative topknot or bowknot.

The maintenance of the mentioned knot has always been a great problem as, the tension produced by the foot as well as landslides, area efforts and resulting flexion of the action of trekking, constitute the main features due to which the knots and bowknots end undone.

Similar things occur with the cords employed in ambits such as in nautics, camping and other applications that require alternative gathering and liberation adequate for the circumstances happening while sailing or pitching tents, being the case.

Hindrance is also present in packets, wrappings, bundles secured by means of bindings, as, if they are loose they tend to open; while, if they are too tightly fastened they must cut the cord or string employed for the fastening embrace. These problems, being evident do not need further explanations.

The fastening that constitutes the object of the present invention, has faced and obviated the outlined problems in a simple and efficient way, providing s positional fastener with guiding cord means that combine two opposed levers with different lengths, each ended in jaws and hooking delimiting between them one of the paths of the cord with an unidirectional fastening effect, and in which the greater lever is outdone and bent due to the traction of the end of the cord, thus forcing to displacement the smaller lever until the hooking in the same is produced. In such a way that, if the cord is interleaved among both levers, said cord results firmly secured by the mentioned hooking.

On the other hand, the smaller lever includes a holder at its end that enables the unhooking from the levers in an immediate way and, consequently, the unloosening of the cord with the additional particularity that this maneuver may be carried out employing only one hand, even in the case of using a dual set of fasteners, as is foreseen in the case of applying said device at the inlet and outlet of the cordage of the footwear.

Thus the invention results quite practical, easy to manage and low cost, bearing in mind that it can be structured in a single piece.

Furthermore, —keeping in mind that in applications such as footwear, the knot or bowknot constitutes a traditional decorative effect—the invention has foreseen that the end parts of the cord—as from the fastening points—may adhere as in a detachable way in the form of an apparent topknot or bowknot; thus the footwear shall acquire the traditional appearance, but with a permanent effective fastening that discards all possibilities of uncontrolled loosening or undone knots.

3. State of the Art

In order to solve the same problems, other means and devices of relative positional fastening of cords of any type, have been developed, particularly for shoelaces, the following being mentioned:

U.S. Pat. No. 1,363,393 (by Swanson), related to a fastener for shoe laces consisting on a disciodal support that, provided with a diametrical nerve of rugged surfaces, presents said nerve interleaved among resistance arms of two excentrical and shored levers, of the first type, that articulate on said support; the mentioned resistance arms end in rounded borders that, being projectable against the intermediate diametrical nerve, get near the same in a variable form defining different fastening levels in the paths of the cords to which they press one against the other and another rugged face of the same intermediate nerve.

Thus, it is about a different solution from the one of the present invention, said solution requires of various pieces, two of them consisting in two levers of equal length, type, and shape articulated in rotation axles on the same discoidal support. On the other hand it may be said that, actually, the Swanson patent describes a dual fastening device, as the levers work independently one from the other, as the fastening hold of the cord is not done among the levers, but between the lever and nerve.

U.S. Pat. No. 4,788,755 (by Kasai) that, essentially consists in a fixed body of lateral converging walls, among which a cylindrical fastener mounted in a rotative way with an axle is interleaved, also being displaceable on a track on a line coincident to the longitudinal geometrical axle passing between both fixed walls of the mentioned body; in such a way that between the periphery of the cylindrical fastener—that is rugged—and the fixed lateral walls of the body, each are conformed in paths of variable section according to the relative position occupied by its axle along the track. With which, as the cord tractions in the direction of the convergence of the lateral walls, said paths are strangled, securing the cords.

This embodiment does not employ levers, requires more than one piece and, at least for the unloosening, must be operated with both hands: one to hold the main body, or the cords in its case; and the other to displace the cylindrical fastening towards its unfastening position.

U.S. Pat. No. 4,506,417 (by Hara), consisting in an external long body affected by a transverse path of the cord and a lateral inlet in the form of a neckline; inside this long body there is a nucleus slidingly channeled, that, tensioned by an expansion spring, projects partially out of itself in the form of a pulsating head, and affects a pair of transversal holes which, —in the position of retraction inside the external body—result coincident with the mentioned path, in such a way that when the retractile pulsator of the nucleus is pressed, it is possible to freely insert one or two cords through the mentioned perforations, while, —when liberating the nucleus from the action of the spring—the relative displacements between paths forms a retentive mordant effect.

This embodiment differs from the one of the invention in that it does not employ levers, it works by means of an excentrical fastening and includes, at least three pieces that make the manufacturing and the assembling very expensive.

Similar to the Hara patent, fastenings of two eccentric rings, are known, which are aligned one to the other on different superposable planes and respectively joined to the opposite sides of an hexagonal deformable ring that acts as an elastic support which, normally, maintains the ring in an excentrical disposition (which is the fastening of the cord passing through its inside), while, pressing on both sides of the elastic support, the rings slide up to the coincidence of their perforations; thus producing the consequent liberating of the cord.

Due to the fact that this device has a similar principle than that of the Hara patent—except that it may be manufactured in one single piece and may be managed with one hand, the same mentioned differences may be applied respecting the present invention.

U.S. Pat. No. 1,570,015 (by Troxel), is a fastener for shoe laces consisting in pieces that, affected by V-shaped necklines, have a rotative mounting on base tracks; in such a way that the cord is deeply wedged and, as the piece rotated on its own axis, the fastening position is completed; while the relative disposition of each piece on its track is the one that confers the adjustment tension: the device also including an intermediate piece that is the one that holds the topknot.

Obviously, besides having an expensive structure, of a relatively complicated assembling, it cannot be maneuvered with one hand, it results antiaesthetic and has no levers.

U.S. Pat. No. 1,085,550 (by De Bri), is only a shoe lace holder (not a fastener), and that said hold is simply done by means of a clasp elastically tensed towards the shutting position, the jaws maintain the shoelaces tensed and previously interleaved among the same. This embodiment, as well as having an expensive an antiaesthetic construction (being done more to the measure of boots from the beginning of the century that what is proposed here), requires the use of both hands (one to open the clasp and the other to put and hold the cord until the clasping closing is done by the former).

U.S. Pat. No. 264,302 (by Joyce) is also an old version of the retention of the cord through an eyelet with a rolling axis and a V-shaped neckline to fasten the ends. Even nowadays it is being used, not to fasten shoelaces but to fix the ends of the strings in the assembling of bookbinded folios for files; but it does not have levers, it is not a fastener but a tying means, and constitutes a resource clearly different from that of the new invention.

Other fastening means are also known such as those based in forced wedgings and zigzag run, as the one of the deadeyes of sailing ships, the multiperforated wooden fasteners employed in the cords of tents, or the embodiment of the Argentine Patent N. 55.895; all these not having any constitutive nor functional relation with the described herein.

Consequently, before the state of the art, the invention offers sufficient constitutive and functional differences that guarantee its level of novelty; with the particularity of allowing a self-fastening effect of the inserted cord when it is one-way tractioned (in the fastening direction), although it may be liberated in a completely practical way by means of a simple pulsation or pressure with one hand on the pulsating holder provided to that effect.

Furthermore, the fact of being able to be structured in a metallic or plastic single piece, gives an additional advantage from which derives its low cost, thus helping the possibility of massive employment, without rising the price of the final application product.

The inventor has done tests of the invention by means of prototypes—the latter being produced in resin as stereolitographic samples—confirming its complete effectivity.

Due to all the abovementioned it may be easy to image the acceptability the new fastening means will have when being carried out, in any of the categories and destination given, as, due to the features that define it may be applied to the fastening of shoe laces as well as to cords and strap ends for vessels; tapes, cords and belts for rolling, elevating and folding curtains; cords to hold up tents and canopies; cords for adjusting of clothes or bags that employ cords for closing; fasteners for tensile cords, etc. The application of the present invention is also practical in sportive activities involving the use of cords such as mountaineering and, in general, any application requiring the unidirectional and automatic fastening of a cord, tape, end, wire or cable inserted through a device, with the possibility of a quick loosening of the same.

III. BRIEF DESCRIPTION OF THE DRAWINGS

For a better clarity and comprehension of the object of the invention, it is illustrated with various figures, in which it has been represented in some of the preferred embodiments; all as an illustrative, not limiting example, being:

FIG. 1, is a front side view in perspective of the fastener, giving a clear idea of its structural constitution of a plastic, metallic, etc. single piece. In the figure, the limits of the fixing base have been represented with dotted lines, as their configuration may vary according to the given specific application.

Figure 2:
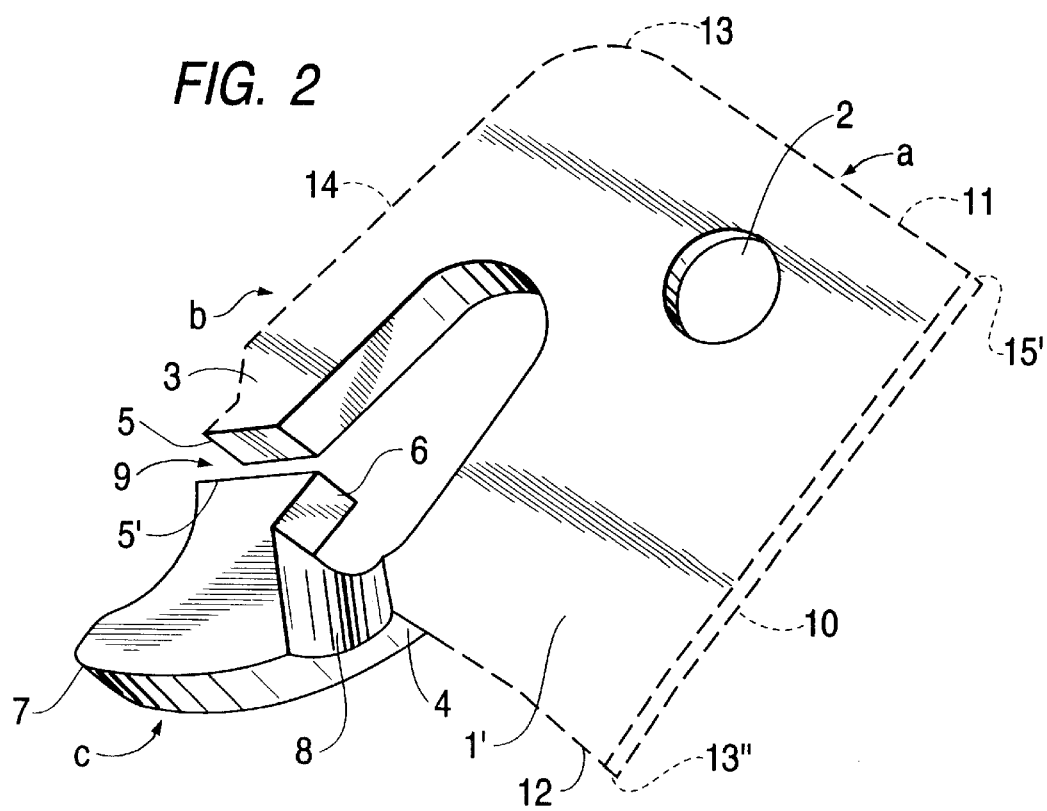

FIG. 2, another view in perspective of the same single piece fastener, this time showing the reverse of the illustration in FIG. 1 in order to show the presence of the guiding channeling corresponding to the output segment of the cord.

FIG. 3, a view of the pair of single pieces destined to conform a "right and left" set in the embodiment applicable to shoelaces. As it may be observed, said single pieces are disposed operationally in a symmetrical way respecting a virtual symmetrical axis that separate them; thus—in order to produce the loosening of the cord—both commanding holders may be actioned at the same time with one hand.

FIG. 4, a side view of the single piece showing part of the reverse of the channeled guide.

FIG. 5, another side view of the single piece seen on the opposite part of the illustration in FIG. 4, form the pulsing holder.

FIG. 6, an inferior view of the single piece, according to the view illustrated in FIG. 10.

FIG. 7, is a top plant view of the single piece considered according to the view in FIG. 10.

Figure 8:
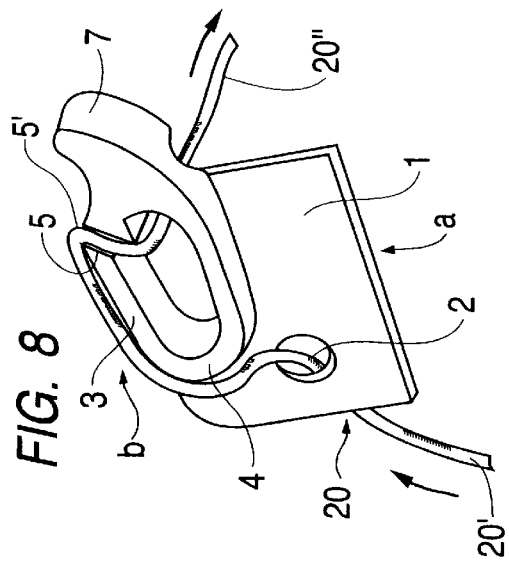

FIG. 8, a view in perspective of the fastener, indicating the run of the cord inserted through the same in the indicated form.

Figure 9:
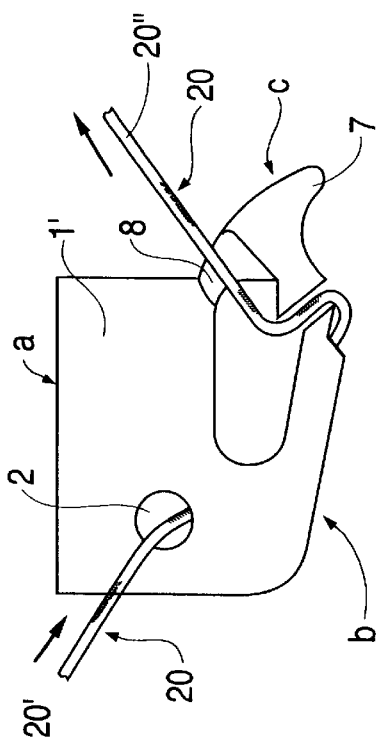

FIG. 9, a reverse view of the same fastener, with the cord able to be freely threaded and tractionable according to the arrows.

FIG. 10, is a front elevated view of the fastening piece, with the cord inserted able to be tractioned according to the arrows, allowing its free displacement while the bigger lever is outdone and bends towards a position disposed under the fastening lever.

Figure 12:
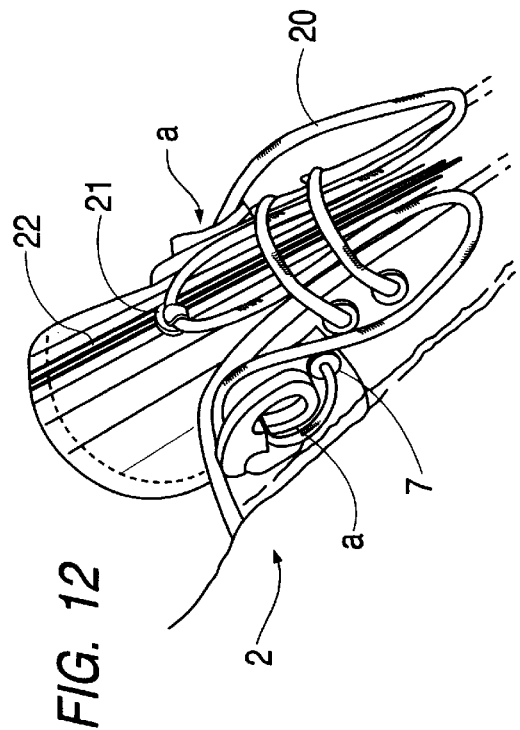
Figure 11:
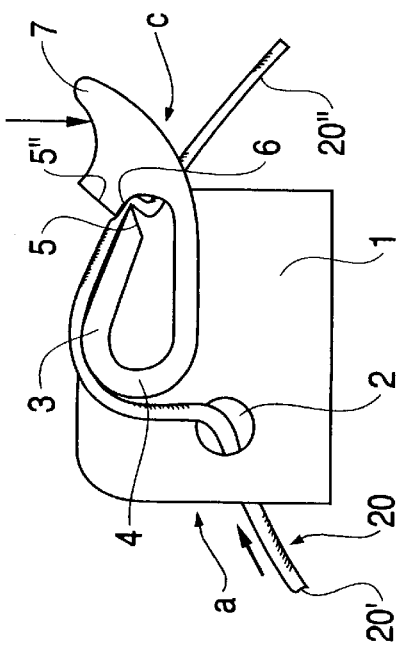

FIG. 11, a front view of the piece, after the unidirectional retentive fastening of the cord thus resulting firmly secured between both jaws; said cord able to be easily loosened from its fastening by means of a simple pulsing of the holder—according to the arrow—provided by the smaller lever; and finally FIG. 12, a detail of one of the preferred embodiments—and not limiting—of the dual fastener in FIG. 3 in the cordage of footwear. In the same figure it is also illustrated how it is possible to form a decorative conventional bow-knot with the ends of the cord, that can be secured by means of clasps of holding means through contact with the tongue of the shoe to which it is applied.

In the different figures, the same reference numbers indicate equal or corresponding parts, while the sets of various elements have been signaled with letters.

(a) supporting body (it can conform a fixing base)
(b) first lever arm (or—longer—fastening lever)
(c) second lever arm (or smaller fastening lever)
(z) footwear of application
(1) obverse face of (a)
(1') back face of (a)
(2) buttonhole of (a) (as a means of insert of the cord (20))
(3) longitudinal guiding nerve of lever (b)
(3') railing of adjacent lateral containment to (3)
(3") intermediate longitudinal section of the nerve in "C", opposed to (3)
(4) bending guide (links the sections (3) and (3") of the same nerve)
(5) free extreme of jaw, of lever arm (b)
(5') free extreme of jaw of lever arm (c)
(6) retentive hooking tooth conformed in (5')
(7) handle (or loosening means of the retentive hooking)
(8) transverse channeled guide of back
(9) oblique passage of the cord, delimited between (5) and (5')
(10) longitudinal edge of the base (a), opposed to the edge (14)
(11) first transverse edge of the base (a)
(12) second transverse edge of the base (to), opposed to (11)
(13) rounded corner between the edge (14) and (11)
(13') corner between the edges (10) and (11), opposed to (13)
(13") corner between the edges (10) and (12), slantingly opposed to (13)
(14) edge proximal to the greater lever (b), opposed to (10)
(20) cord (cord, end, cordon, cable, tape, etc.)
(20') tractionable section of cord (20)
(20") extreme of traction of the cord (20), opposed to (20')
(21) clasp or subordination means of the decorative knot to the tongue of footwear
(23) tab of the application footwear (z)

IV. SUMMARY OF THE INVENTION

The new fastener for cords is destined in general to allow the insertion through the same of the cord of application (20), including a) a supporting body (a), with insertion and guiding means—inlet and outlet respectively—of said application cord (20);

b) a first lever arm (b) and a second lever arm (c) which, respectively projected in a counterpoised disposition as from its origin in said supporting body (a), each end freely in jaw ends (5) and (5') delimiting a path (9), which in virtue of the bending of the first lever arm (b) tractioned by the cord (20), is of variable section, c) a retentive hooking tooth (6) which, projected in an adjacent form to the end of jaw (5') of the second arm (c), constitutes a positional retentive means of the jaw end (59 corresponding to said first arm when the same—in response to the traction of the cord (20)—is disposed elastically bent against the internal face of said second arm (c);

d) loosening means (7) of said retentive effect, provided by the second lever arm (c);

e) longitudinal guiding means (3–3') of the cord (20), provided by the first lever arm (b) in an area included between is jaw end (5) and the insertion means (2) corresponding to the inlet section (20') of said cord (20) in the supporting coed (a);

f) and guiding means (8) of the outlet of section (20") of the cord (20), aligned with the retentive tooth (6) of the second arm (c).

V. DETAILED DESCRIPTION OF THE PREFERRED EMBODIMENT

In general terms, the reference fastener consists in a single piece structured in material such as injected plastic, engraved metal or similar appropriate material that includes a supporting body (a) that conforms a long C-shaped nervure, in the form of a salient that projects form the anverse face (1) of said body in the form of sheet or plate, its reverse face (1') being even (FIGS. 1, 2, 4, 5 and 6).

Essentially, this C-shaped salient or nerve includes without continuity solution: a first section conforming de lever arm (b), —entirely originated as from a curve-formed bending (4) that, on the opposite part, prolongs in a longitudinal intermediate section (3") opposite to (3), already mentioned—and a second lever arm (c) that projected out of the base (a) and joined as a bent prolongation of said intermediate longitudinal section (3"), completes the formation of said C-shaped nerve or salient (FIGS. 1 to 11).

Both levers (b) and (c) end in free jaw extremes (5) and (5'), in the shape of even and oblique faces, distanced one from the other in order to conform an oblique path (9) (FIGS. 1 and 2).

More particularly, and as may be seen in the figures, the supporting body (a) is a plastic sheet or plate its conformation and configuration not being important as they simply depend of the configuration and size of the area of application, or the ambit where the fastener is being employed. Thus as a not limiting example, in the drawings illustrating the invention said body has been represented under the shape of a irregular polygonal even wall, with said long C-shaped nerve or salient.

Notwithstanding the abovementioned, in FIGS. 1 and 2 said edges have been identified with numerical references, in order to facilitate the description respecting the distribution of the essential parts of the fastener.

According to the embodiment of said figures, the supporting body (a) has the shape of an even base, conformed by an anverse face (1)—from which said C-shaped nerve projects—an even reverse face (1'), and delimited on the periphery by: a longitudinal edge (10) in which the first and second lateral edges (11) and (12) respectively, origin, the first of then joined to another longitudinal edge (14), opposite and obliquely disposed respecting the edge (10), and the second ending in the long C-shaped nerve or salient. This longitudinal border 814) disposed in an area near the greater lever (b) of the fastener (FIGS. 1 and 2).

Between edges (10) and (11), (10) and (12), as well as between the edge (11) and (14) the corners (13'), (13") and (13) are respectively defined; while, on their part, the edges (14) and (12) concur in a virtual corner that is actually substituted by the presence of the long C-shaped nerve, projected on that same corner area. (FIG. 1)

Next to the first transversal edge (11), the same base (a) affects a perforation and eyelet (2) that, in the application of the invention as a fastener for shoe laces, finishes off in the last eyelet of each line of the cordage (FIG. 12) from where the respective end sections of the cord (20) come out.

As already mentioned, the fourth corner of the polygonal configuration of the base (a), is substituted by the lever system—fastened (b) and fastening (c)—that, under the shape of a continuous, long, C-shaped nerve, constitute the fastener of the device.

The securable lever (b) is conformed by an elastic straight arm in the form of a nerve (3), disposed in a L-shaped form with a railing of adjacent lateral containment (3') formed by a prolongation of the base (a) ended in the edge (14) (FIG. 1).

Moreover, being the third type, this lever (b) has as fulcrum the area of bending integration with the bending guide (4) as from which it projects in the form of a cantilever; through resistance the end of jaw (5) ended on the oblique face that defines a countertooth that can be hooked by (6), while the power arm of the same lever (b) is given by an intermediate section of (3) included between the fulcrum bending (5) and the end of the resistance jaw (5), bendable in (4) by the tension of the cord (20) guided on the section (3).

On the other part, the second lever (c), —that projects from the other end of the C-shaped nerve—being also third type, and being joined to the intermediate longitudinal section (3") by means of a certain elastic bending curve, opposite to the bending (4)—on one part has a lateral projection in the shape of a command holder (7) that conforms is power arm, while, on the other part it ends in a jaw end (5) that conforms its resistance (FIGS. 1 and 2).

This second lever (c)—that is shorter than lever (b)—in the area adjacent to the reverse face (1') of the base (a), is affected by a transversal depression, in the form of a guide channeling of the traction section (20") corresponding to the cord (20) (FIG. 2); while towards the internal part of the long C, the end of jaw (5') conforms a tooth (6) destined to hook in a retentive way the countertooth conformed by the end of the jaw (5) of the first lever (b).

In the case of applying the same as a fastener for footwear (z) cords (20) (FIGS. 3 and 9), one must have one pair of fastener for each footwear cordage (FIG. 3), of identical characteristics as the ones described: Only that being right and left, in order that the command holders (7) result disposed as indicated in FIGS. 3 and 9 to allow the joint command with one hand, putting the thumb on one of those holders, and the index on the other, and pressing in the sense opposite to the compression.

The base (a) is secured to the cordage of the footwear coinciding the eyelet (2) with the last hole of each line of the cordage, destined to allow the coming out of the extreme sections (20") of traction of the cord (2). The securing is effected through sticking, sewing, clasping, riveting or any other adequate conventional procedure, so the fasteners stay firmly secured without altering considerably the design of the footwear (z).

The separate ends (20") of each cord can be tractioned together.

In an accessory manner, not illustrated herein, —as it not of interest to the main object of the invention, that is the fastener—it has also been thought vinculating the ends (20") of each cord (20), to form a continuous cord easier to traction and also they can connect to the tongue or another part of the footwear (a) in a removable way conforming a decorative bowknot.

Thus the ends (20") of the cord (20) can be connected by means of a handle where the rigid terminals concur, said terminals usually have said cords (20); or conforming such terminals as reciprocal coupling means (for example one of them in the shape of a female coupling tubular nozzle, and the other as a male coupling pin in the former. Including in this area a temporary connecting means with the tongue or another part of the footwear (z), such as clasping, hooking or contact sticking means; all this to secure through said connection means of the cord forming the traditional decorative bowknot (FIG. 12).

The set functions in the following way:

The threaded section (20') in each cordage of the footwear (z) is inserted in the eyelet (2) and, passing through the anverse face (1) it is guided all along the longitudinal (3) to introduce itself in the path (9) between the end of jaws (5) and (5') of the levers (b) and (c), respectively and end exiting with its tractioning end (20"), guided by the reverse channeling (8) (FIGS. 8 to 10); with which the footwear (z), having its fasteners is in condition to be used.

When one wishes to put on the footwear (z), one only needs to make larger with the hands the inlet mouth, in response to that the cord slides easily in that sense, as, —similar to what a slight crack on a dented wheel of an escaping mechanism—the fastener do not operate in that direction.

In order to fasten the cord (20), one only needs to traction from the ends 20" of the same, with which it advances in the direction of the arrows indicated in FIGS. 8 to 10. In a correlative way, the same outdoes the elastic tension of the bigger lever (b), that bend like that as from its origin in the bending (4), disposing the counter tooth of its end of jaw (5) under the tooth (6).

While the traction is done—until the desired level of adjustment—, the tension of the cord (20) will maintain the lever (b) bent with its end far from the tooth (6), and the same cord shall continue running easily; but as soon one stops tractioning, the elastic memory of said lever (b) will make it tend to recover its original disposition; with which the counter tooth of the end of jaw (5) will bite the cord (20) against the tooth (6) of the smaller lever (c), fastening it as It is clearly shown in FIG. 11 and preventing it from sliding.

When one wishes to loosen the cord (20) from the fastening action—to modify the adjustment tension of the same or to take of the footwear—one only needs to pulsate the holders (7) en the already indicated way, with which the tension of the lever (c)—according to the arrow—makes happen the unfastening of the teeth (6) and (5) and the consequent loosening of the lever (b) to its position; with the resulting recovery of the free sliding of the cord of FIGS. 1 to 10.

The same fastening and unfastening process of the new fastener is valid for any other applications from the ones indicated in the first part of this specification.

It cannot be doubted that when the present invention is put into practice, modifications concerning certain details in construction and shape, may be introduced without this implying drawing apart from the fundamental principles that are clearly substantiated in the clauses of the following claims:

I claim:

1. A fastener for cords, comprising:

a support body having an insertion means to guide a cord onto a main surface thereof;

a first flexible lever arm provided on the main surface of the support body, the first lever arm having an free jaw end, the first flexible lever arm having a cord guide to guide the cord from the insertion means of the support body to the free jaw end of the first flexible lever arm; and a second flexible lever arm provided on the main surface of the support body, the second flexible lever arm having a free jaw end opposing the free jaw end of the first flexible lever arm with a cord path being defined between the free jaw ends of the first and second flexible lever arms, the cord path having a width that is variable with flexing of the first lever arm, the second flexible lever arm having a retentive hooking tooth provided at a tip of the free jaw end thereof, the free jaw end of the first flexible lever arm fitting under the retentive hooking tooth such that the retentive hooking tooth retains the first flexible lever arm in a flexed position, and the second flexible lever arm having loosening means thereon for releasing the first flexible lever arm from under the retentive hooking tooth.

2. A fastener for cords according to claim 1, wherein the insertion means is an eyelet provided through the support body.

3. A fastener for cords according to claim 1, wherein the first and second flexible lever arms are provided at ends of a unitary member, the unitary member being approximately C-shaped.

4. A fastener for cords according to claim 1, wherein the first flexible lever arm has a tipped end which fits under the retentive hooking tooth of the second flexible lever arm.

5. A fastener for cords according to claim 1, wherein the loosening means is a projection on the second flexible lever arm to allow the second flexible lever arm to be moved, thereby freeing the first flexible lever arm.

6. A fastener for cords according to claim 1, wherein the cord guide is formed of an upper surface of the first flexible lever arm such that the cord is guided between the upper surface and a portion of the support body adjacent thereto, the upper surface ending at the free jaw end of the first flexible lever arm.

7. A fastener for cords according to claim 1, wherein the support body is a plate, the first and second flexible lever arms being provided at ends of a unitary member formed on the support body, the unitary member being approximately C-shaped with the support body not being provided in an interior portion of the C-shaped unitary member.

8. A fastener for cords according to claim 1, wherein the fastener is a single piece device.

9. A fastener for cords according to claim 1, wherein the fastener is formed as a single piece plastic device.

10. A fastener for cords according to claim 1, wherein the fastener is formed as a single piece metallic device.

* * * * *